(12) United States Patent
Belghoul et al.

(10) Patent No.: US 10,440,765 B2
(45) Date of Patent: Oct. 8, 2019

(54) MULTI-RAT RADIO RESOURCE AGGREGATION WITH SPLIT BEARER SUPPORT

(71) Applicant: Apple Inc., Cupertino, CA (US)

(72) Inventors: Farouk Belghoul, Campbell, CA (US);
Tarik Tabet, Los Gatos, CA (US);
Dawei Zhang, Saratoga, CA (US)

(73) Assignee: Apple Inc., Cupertino, CA (US)

(*) Notice: Subject to any disclaimer, the term of this patent is extended or adjusted under 35 U.S.C. 154(b) by 301 days.

(21) Appl. No.: 14/862,735

(22) Filed: Sep. 23, 2015

(65) Prior Publication Data

US 2016/0088542 A1 Mar. 24, 2016

Related U.S. Application Data

(60) Provisional application No. 62/054,539, filed on Sep. 24, 2014.

(51) Int. Cl.
*H04W 76/15* (2018.01)
*H04W 28/08* (2009.01)
(Continued)

(52) U.S. Cl.
CPC ....... *H04W 76/15* (2018.02); *H04W 28/0231* (2013.01); *H04W 28/0268* (2013.01); *H04W 28/08* (2013.01); *H04W 36/28* (2013.01); *H04W 36/14* (2013.01); *H04W 76/16* (2018.02); *H04W 84/12* (2013.01); *H04W 88/06* (2013.01)

(58) Field of Classification Search
None
See application file for complete search history.

(56) References Cited

U.S. PATENT DOCUMENTS

2013/0132604 A1 5/2013 Cohen et al.
2014/0010207 A1 1/2014 Horn et al.
(Continued)

FOREIGN PATENT DOCUMENTS

CN 101594374 A 12/2009
WO WO 2010053281 A2 5/2010
(Continued)

OTHER PUBLICATIONS

European Search Report, Application No. 15186622, dated Feb. 2, 2016, 9 pages.

(Continued)

*Primary Examiner* — Yaotang Wang
(74) *Attorney, Agent, or Firm* — Meyertons Hood Kivlin Kowert and Goetzel PC; Jeffrey C. Hood

(57) ABSTRACT

This disclosure relates to aggregation of radio resources provided according to multiple radio interfaces. According to some embodiments, a base station may establish a radio bearer with a wireless user equipment (UE) device. The radio bearer may initially utilize a first radio interface between the base station and the UE. The base station may receive an indication to aggregate radio resources of an access point that utilizes a second radio interface for the UE. Based on the indication to aggregate radio resources for the UE, the base station may redirect at least a portion of data of the radio bearer by way of the access point to be exchanged with the UE using the second radio interface.

27 Claims, 14 Drawing Sheets

(51) Int. Cl.
  *H04W 28/02* (2009.01)
  *H04W 36/28* (2009.01)
  *H04W 36/14* (2009.01)
  *H04W 84/12* (2009.01)
  *H04W 88/06* (2009.01)
  *H04W 76/16* (2018.01)

(56) References Cited

U.S. PATENT DOCUMENTS

| | | | |
|---|---|---|---|
| 2014/0133298 A1 | 5/2014 | Han et al. | |
| 2014/0269632 A1 | 9/2014 | Blankenship et al. | |
| 2015/0043435 A1 | 2/2015 | Blankenship et al. | |
| 2015/0201410 A1 | 7/2015 | Tang | |
| 2015/0327236 A1* | 11/2015 | Lin | H04W 72/0406 370/329 |
| 2016/0373964 A1* | 12/2016 | Nagasaka | H04W 28/08 |
| 2018/0175970 A1* | 6/2018 | Jung | H04W 88/10 |

FOREIGN PATENT DOCUMENTS

| | | |
|---|---|---|
| WO | WO2011100492 A1 | 8/2011 |
| WO | 2011159215 A1 | 12/2011 |
| WO | WO2012000084 A1 | 1/2012 |
| WO | 2014047939 A1 | 4/2014 |
| WO | WO2014110810 A1 | 7/2014 |
| WO | WO2015015293 A2 | 2/2015 |
| WO | WO2015032565 A1 | 3/2015 |

OTHER PUBLICATIONS

Office Action, Chinese Application for Invention No. 201510807532.0, dated Apr. 26, 2018, 35 pages.

Extended European Search Report, European Patent Application No. 18168438.2, dated Jul. 25, 2018, 11 pages.

Third Office Action, Chinese Application for Invention No. 201510807532.0, dated Dec. 14, 2018, 12 pages.

* cited by examiner

MULTI-RAT RADIO RESOURCE AGGREGATION WITH SPLIT BEARER SUPPORT

PRIORITY INFORMATION

This application claims priority to U.S. provisional patent application Ser. No. 62/054,539, entitled "Multi-RAT Radio Resource Aggregation with Split Bearer Support," filed Sep. 24, 2014, which is hereby incorporated by reference in its entirety as though fully and completely set forth herein.

FIELD

The present application relates to wireless communication systems, including techniques for aggregating radio resources of multiple radio access technologies.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), Bluetooth, and others. While some techniques for coordinating between different wireless communication technologies exist, interworking mechanisms are generally not very well developed, and so improvements in the field would be desirable.

SUMMARY

Embodiments are presented herein of methods for aggregating radio resources of multiple radio access technologies (RATs) and for supporting radio bearers split between radio interfaces of those multiple RATs, and of devices configured to implement the methods.

According to the techniques presented herein, it may be possible for a base station to act as an anchor point for radio resource aggregation using multiple RATs for a given wireless device. For example, the base station may provide a cellular data connection (e.g., according to LTE or another cellular communication technology) with the wireless device. The wireless device may also detect that an access point providing a wireless network (e.g., a Wi-Fi network) is within communicative range of the wireless device, and indicate to the base station the availability of the access point and the wireless device's support for multi-RAT radio resource aggregation.

Based on the availability of the access point and the wireless device's support for multi-RAT radio resource aggregation, the base station may then initiate radio resource aggregation of the LTE radio resources provided to the wireless device by the base station and of the Wi-Fi radio resources provided to the wireless device by the access point.

Aggregating the radio resources may include establishing radio bearers according to any or all of the available RATs. In some instances, a radio bearer may be split between multiple RATs. For example, some data of a radio bearer might be communicated between the base station and the wireless device directly (e.g., using a cellular communication technology) while other data of the radio bearer might be communicated between the base station and the wireless device indirectly (e.g., using a wireless networking technology, by way of the access point).

By aggregating such radio resources at a base station, opportunities to improve end user Quality of Service (QoS) and operator network utilization may be realized. For example, radio resource usage may be improved by matching underlying radio bearer needs with the characteristics of the available radio interface(s).

The techniques described herein may be implemented in and/or used with a number of different types of devices, including but not limited to cellular base stations, access point devices, cellular phones, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings, in which.

Figure 1:
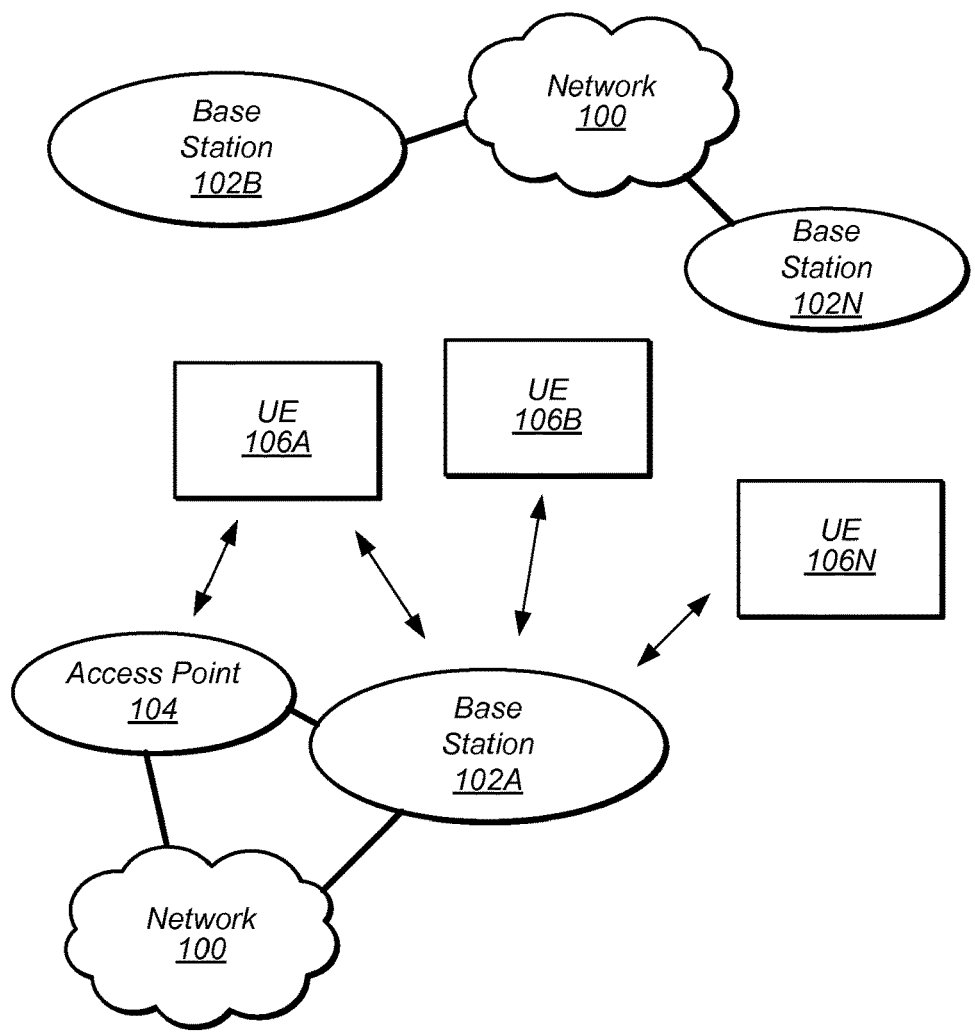
FIG. 1 illustrates an exemplary (and simplified) wireless communication system.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system that connects to the first computer system over a network, such as the Internet. In the latter instance, the second computer system may provide program instructions to the first computer for execution. The term "memory medium" may include two or more memory mediums that may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices that are mobile or portable and that performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) that is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

IEEE 802.11—refers to technology based on IEEE 802.11 wireless standards such as 802.11a, 802.11.b, 802.11g, 802.11n, 802.11-2012, 802.11ac, 802.11 ax, and/or other IEEE 802.11 standards. IEEE 802.11 technology may also be referred to as "Wi-Fi" or "wireless local area network (WLAN)" technology.

Figure 2:
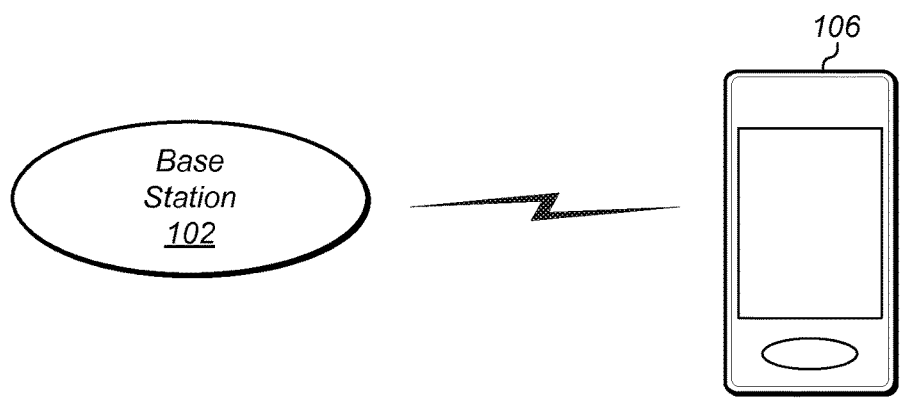
FIG. 2 illustrates an exemplary base station (BS) in communication with an example user equipment (UE) device.

FIGS. 1 and 2—Communication System

FIG. 1 illustrates an exemplary (and simplified) wireless communication system in which aspects of the present disclosure may be implemented, according to some embodiments. It is noted that the system of FIG. 1 is only one example of a possible system, and embodiments may be implemented in any of various systems, as desired.

As shown, the exemplary wireless communication system includes a base station 102A, which can communicate over a transmission medium with one or more (e.g., an arbitrary number of) user devices 106A, 106B, etc., through 106N. Each of the user devices may be referred to herein as a "user equipment" (UE). Thus, the user devices 106 are referred to as UEs or UE devices.

The base station 102A may be a base transceiver station (BTS) or cell site (a "cellular base station"), and may include hardware that enables wireless communication with any or all of the UEs 106A through 106N. The base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (WCDMA, TD-SCDMA), LTE, LTE-Advanced (LTE-A), 3GPP2 CDMA2000 (e.g., 1×RTT, 1×EV-DO, HRPD, eHRPD), Wi-Fi, WiMAX etc.

Additionally, one or more access points (such as access point 104) may be communicatively coupled to the network 100, and may be within communicative range of one or more UEs 106. These may include Wi-Fi access points configured to support cellular network offloading and/or otherwise provide wireless communication services as part of the wireless communication system illustrated in FIG. 1. Such access points may be collocated with a cellular base station or may be deployed separately from any cellular base stations, as desired. In some instances (e.g., for network-deployed access points), such an access point may have a backhaul communication reference point with a base station, such as illustrated between access point 104 and base station 102A.

Base station 102A and other similar base stations (such as base stations 102B . . . 102N) and/or access points (such as access point 104) operating according to the same or a different wireless communication standard may thus be provided as a network of cells, which may provide continuous or nearly continuous overlapping service to UEs 106A-N and similar devices over a wide geographic area via one or more wireless communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations) and/or wireless local area networks (WLANs), which may be referred to as "neighboring cells" or "neighboring WLANs" (e.g., as appropriate), and/or more generally as "neighbors". Such neighbors may also be capable of facilitating communication between user devices and/or between user devices and the network 100. Such neighbors may include "macro" cells, "micro" cells, "pico" cells, "femto" cells, WLANs, and/or cells that provide any of various other granularities of service area size. For example, base stations 102A-102B illustrated in FIG. 1 might provide macro cells, base station 102N might provide a micro cell, and access point 104 might be a Wi-Fi AP that provides a WLAN. Other configurations are also possible.

Note that a UE 106 may be capable of communicating using multiple wireless communication standards. For example, a UE 106 might be configured to communicate using two or more of GSM, UMTS, CDMA2000, WiMAX, LTE, LTE-A, WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with a base station 102 (e.g., one of the base stations 102A through 102N), according to some embodiments. The UE 106 may be a device with cellular communication capability such as a mobile phone, a hand-held device, a wearable device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) or ASIC (application specific integrated circuit) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), and/or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for different wireless communication protocols with which it is configured to communicate. As a further possibility, the UE 106 may include one or more radios that are shared between multiple wireless communication protocols, and one or more radios that are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
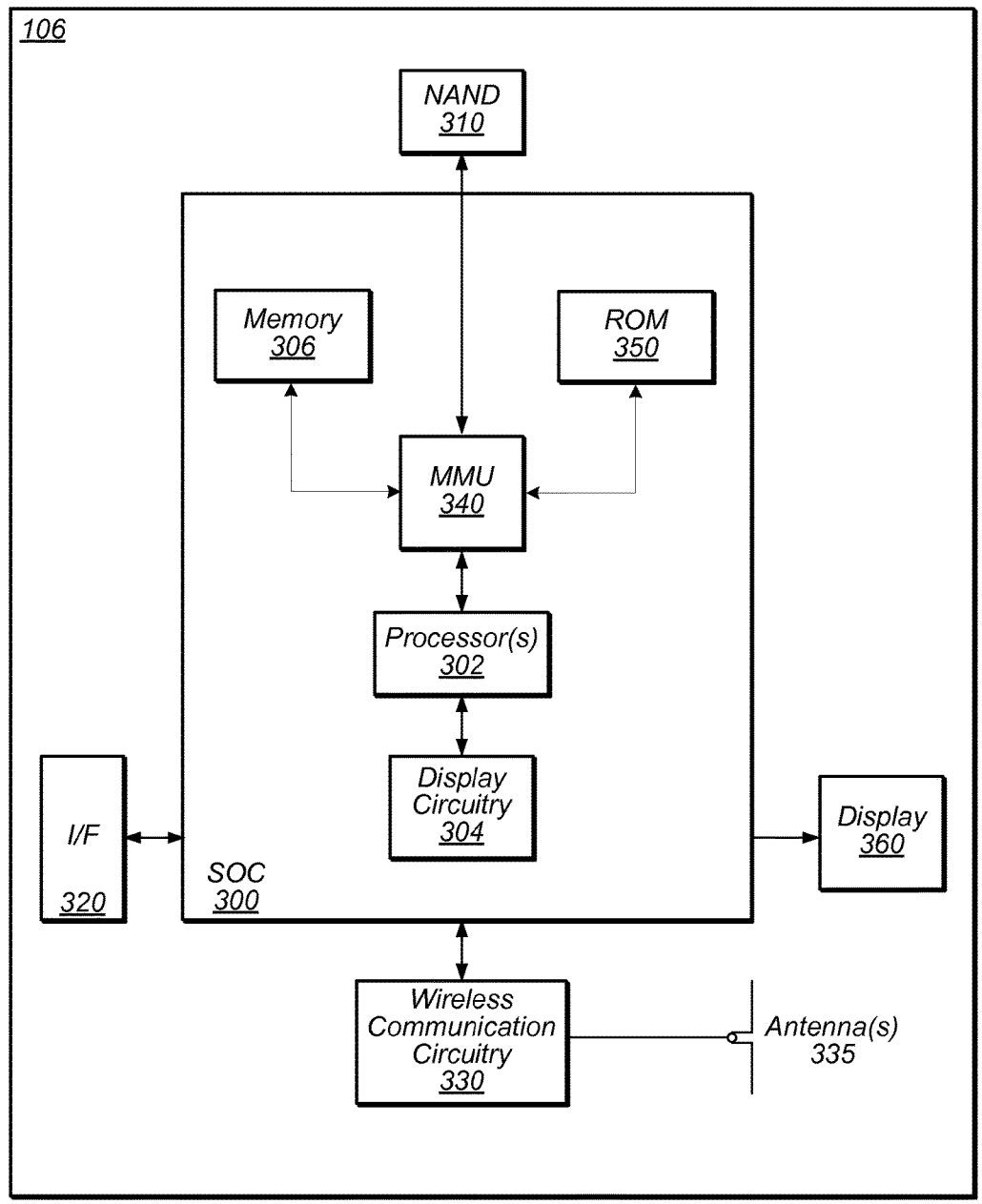
FIG. 3 illustrates an exemplary block diagram of a UE.

FIG. 3—Exemplary Block Diagram of a UE

FIG. 3 illustrates an exemplary block diagram of a UE 106, according to some embodiments. As shown, the UE 106 may include a system on chip (SOC) 300, which may include portions for various purposes. For example, as shown, the SOC 300 may include processor(s) 302 that may execute program instructions for the UE 106 and display circuitry 304 that may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna(s) 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described further subsequently herein, the UE 106 may include hardware and software components for implementing part or all of the methods described herein. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein.

Figure 4:
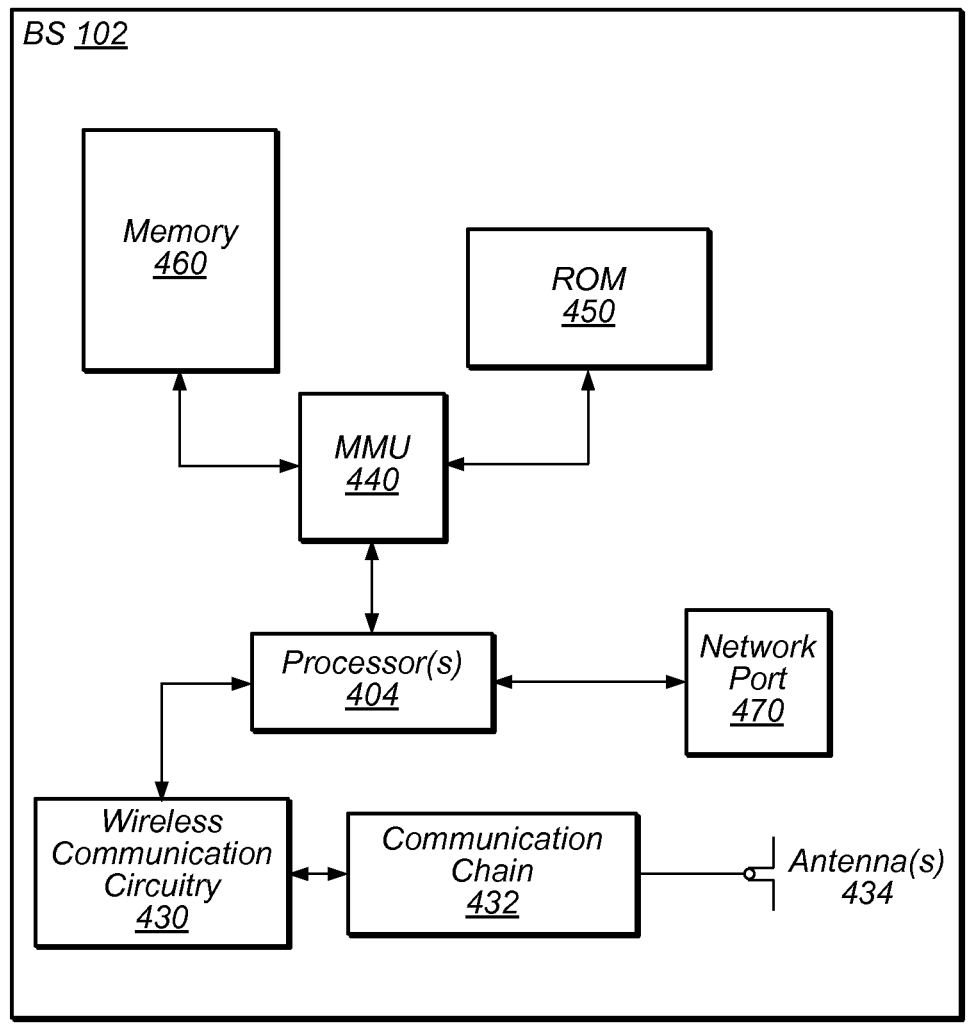
FIG. 4 illustrates an exemplary block diagram of a BS.

FIG. 4—Exemplary Block Diagram of a Base Station

FIG. 4 illustrates an exemplary block diagram of a base station 102, according to some embodiments. It is noted that the base station of FIG. 4 is merely one example of a possible base station. As shown, the base station 102 may include processor(s) 404, which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to a telephone network, such as the telephone network described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the wireless communication circuitry 430 via communication chain 432. Communication chain 432 may be a receive chain, a transmit chain or both. The radio 430 may be configured to communicate via various wireless telecommunication standards, including, but not limited to, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as either or both of an LTE base station and a Wi-Fi access point. As another possibility, the base station 102 may include a multi-mode radio that is capable of performing communications according to any of multiple wireless communication technologies (e.g., LTE and Wi-Fi, LTE and UMTS, etc.).

The base station 102 may include hardware and software components for implementing part or all of the methods described herein. The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement part or all of the features described herein.

Figure 5:
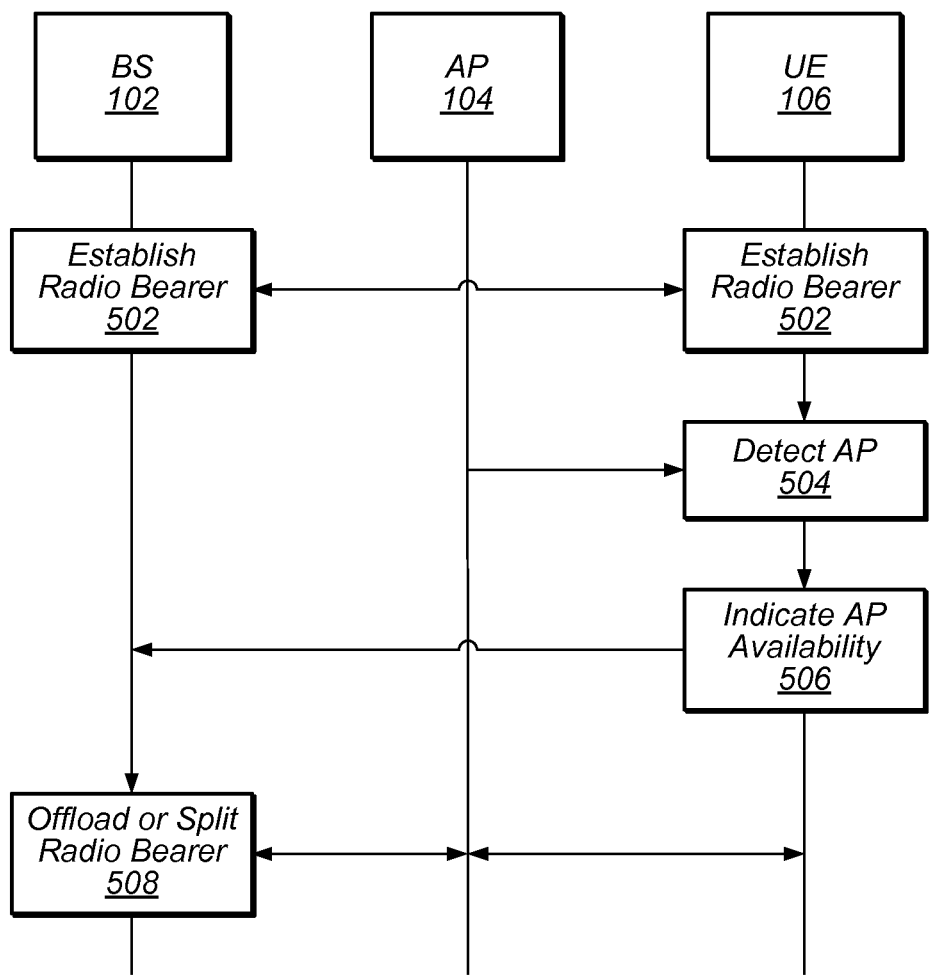
FIG. 5 is a communication flow diagram illustrating an exemplary method for aggregating radio resources of multiple RATs.

FIG. 5— Communication Flow Diagram

As previously noted, it is increasingly common for wireless devices to be equipped with the capability to communicate using multiple wireless communication technologies. For example, many smart phones are able to communicate using both IEEE 802.11 wireless local area networking (WLAN) and 3GPP (LTE/UMTS/GSM) and/or 3GPP2 (CDMA2000/cdmaOne) cellular radio interfaces, such that a user of such a device may be able to use a cellular data connection simultaneously with a WLAN connection.

Furthermore, increasingly small cells with collocated WLAN/cellular interfaces are being deployed by cellular network operators. In such cases, operator provided WLAN access points may be used for traffic offloading, for example with 3GPP traffic offloading and interworking mechanisms between cellular and WLAN base stations and access points. Techniques for providing more closely integrated cellular and WLAN dual connectivity to wireless devices (e.g., in conjunction with providing collocated network operator deployed WLAN/cellular cells) may improve any or all of data throughput, Quality of Service, and/or network utilization/radio resource efficiency of communication between wireless devices and a network implementing such techniques, thus potentially benefiting both user devices and network operators.

Such dual-connectivity may be facilitated by providing for a cellular base station to act as an anchor point for aggregating radio resources according to multiple wireless communication technologies. Accordingly, FIG. 5 is a communication/signal flow diagram illustrating such a method for aggregating radio resources according to multiple wireless communication technologies, according to some embodiments. Aspects of the method of FIG. 5 may be implemented by a cellular base station, Wi-Fi access point, wireless user equipment device, or more generally in conjunction with any of the computer systems or devices shown in the above Figures, among other devices, as desired.

In various embodiments, some of the elements of the method shown may be performed concurrently, in a different order than shown, may be substituted for by other method elements, or may be omitted. Additional method elements may also be performed as desired. As shown, the method may operate as follows.

A base station (BS) 102 and a wireless user equipment (UE) device 106 may establish a ("first") radio bearer (502). The first radio bearer may (at least initially) utilize a cellular (e.g., 3GPP or 3GPP2) radio interface, such as an LTE, UMTS, or GSM radio interface. The first radio bearer may provide a portion of a network connection for an application executing at the UE 106. For example, the radio bearer may be established as part of a network connection by the UE 106 to a particular packet data network (PDN) with a particular access point name (APN) by way of the base station 102 (and a core network to which the base station 102 is communicatively coupled), in order to provide network connectivity to the application.

The application itself may be any of a variety of types of application. The characteristics of the various applications that may use cellular communication may differ greatly from one another. For example, some applications, such as high-definition real-time video chat or videoconferencing applications and certain gaming applications, may (at least in some instances) be relatively demanding with respect to bandwidth, latency, and other communication link characteristics. Other applications, such as bulk data transfers (e.g., file uploads/downloads), may (at least in some instances) be very flexible with respect to bandwidth demands/usage, and may not be particularly sensitive to link latency. According to some embodiments, voice applications may utilize fixed (or approximately fixed) sized packets that may be communicated at regular (or approximately regular) intervals, and, compared with many other applications that utilize cellular communication links, voice applications packets may be relatively small. Machine type communication (MTC) may also include periodic, low data rate communication, at least in some instances. Such communication may be used by process control devices, automation devices, measurement/monitoring devices such as thermometers, barometers, hydrometers, electricity meters, seismometers, etc., among various possibilities.

Given the differing characteristics of different types of applications that may use cellular links, different radio bearer characteristics may be selected depending on the application type for which the first radio bearer is being established. For example, a QoS class indicator (QCI) value may be selected for the first radio bearer as part of its establishment. Similarly, in order to facilitate multiple wireless communication technology radio resource aggregation and interworking, a marker/value may be selected to indicate whether the first radio bearer may be offloaded to another radio access technology (e.g., WLAN). If desired, a further marker/value may be selected to indicate whether the first radio bearer supports a split bearer configuration, such that the bearer is capable of carrying data over any of multiple radio access technologies.

Marking whether a radio bearer is offloadable, and whether a radio bearer is splittable, may be performed by the cellular core network (e.g., by a mobility management entity (MME) of the network). This decision may be based partially or entirely on application type of an application associated with the radio bearer, network loading considerations, current RF conditions, UE subscription parameters, and/or any of various other considerations, as desired. As one specific possibility, higher priority applications (such as voice applications, in some embodiments) may be marked as not-offloadable and not-splittable, e.g., in order to ensure bearers for such applications utilize a (potentially more reliable) cellular radio interface, while lower priority applications/operations (such as background or bulk data transfer operations, in some embodiments) may be marked as offloadable and/or splittable, e.g., in order to allow such operations to have the potential to obtain greater throughput by using radio resources of multiple radio access technologies. Other methodologies (e.g., using RF conditions, network loading considerations, or other factors in addition to or instead of application priority level) for determining whether to mark a bearer as offloadable and/or splittable are also possible.

Once the first radio bearer has been established, the UE 106 and the BS 102 may directly exchange data of the first radio bearer using a cellular radio interface. This may include uplink transmissions from the UE 106 to the BS 102 and/or downlink transmissions from the BS 102 to the UE 106.

The UE 106 may detect an access point (AP) 104 (504). The UE 106 may detect the AP 104 by receiving a beacon transmission broadcast by the AP 104, as one possibility. For example, an 802.11 AP may periodically broadcast beacon transmissions with information regarding the wireless network provided by the AP (e.g., service set identifier (SSID), timestamp (for synchronization), capability and/or rate information, current network loading information, and/or any of various other types of information), which the UE 106 may consider as part of a decision whether to join the network (and/or how highly to rank the network among available networks).

The detected AP 104 may, at least in some instances, be a cellular network operator deployed AP configured specifically to provide supplementary radio resources (e.g, cellular offloading and/or split bearer support) to subscribers of that cellular network. Such an AP may be collocated with a cellular base station (e.g., as part of a small cell deployment), or may be located separately from a cellular base station, and may have a backhaul connection to the cellular network and one or more nearby cellular base stations.

The UE 106 may be provided with information assisting the UE 106 to discover such an AP, in some instances. For example, the UE 106 may receive information regarding nearby network-deployed APs in a system information block (SIB) from the BS 102, from an access network discovery and selection function (ANDSF) module, and/or by any other mechanism to help the UE 106 identify APs that may be able to provide the UE 106 with additional radio resources.

If the AP 104 meets certain criteria, the UE 106 may determine that the AP 104 is capable of providing radio resources (e.g., using a WLAN radio interface) to the UE 106. For example, the ANDSF may, in addition to providing discovery information to help the UE 106 identify nearby APs, provide one or more rules for determining for what uses to the UE 106 a given AP is suitable. Such rules may relate to signal strength, network capabilities, current network load, and/or any of various other characteristics. If the AP 104 meets the minimum threshold requirement(s) with respect to such characteristics, the UE 106 may determine that radio resources would be available to the UE 106 from the AP 104. The UE 106 may then join the basic service set of (e.g., join the wireless network provided by) the AP 104, e.g., according to its WLAN selection/re-selection rules.

Having joined the wireless local area network provided by the AP 104 (or, if desired, prior to joining the WLAN provided by AP 104), the UE 106 may indicate the availability of the AP 104 to the BS 102 (506). For example, the UE 106 may transmit (e.g., using radio resource control (RRC) signaling) to the BS 102 a request for radio resource aggregation of radio resources provided by the AP 104 and radio resources provided by the BS 102. If desired, the UE 106 may also indicate one or more radio bearers to offload to the AP 104 when requesting radio resource aggregation. For example, the UE 106 may indicate to the BS 102 to offload or split the first radio bearer to the WLAN radio interface provided by the AP 104 (e.g., if the first radio bearer is marked as being offloadable or splittable).

The BS 102 may offload one or more radio bearers to the WLAN radio interface provided by the AP 104, or may split one or more radio bearers between the WLAN radio interface provided by the AP 104 and the cellular radio interface provided by the BS 102 (508). For example, if the first radio bearer supports offloading to WLAN, the BS 102 may offload the first radio bearer, and/or if the first radio bearer supports a split bearer configuration between cellular and WLAN radio interfaces, the BS 102 may split the first radio bearer such that some data of the first radio bearer is exchanged between the BS 102 and the UE 106 via the cellular radio interface of the BS 102 and the UE 106 and some data of the first radio bearer is exchanged between the BS 102 and the UE 106 via the backhaul connection between the BS 102 and the AP 104, and via the WLAN radio interface of the AP 104 and the UE 106.

It should be noted that the decision to offload a radio bearer to a different radio access technology or split a radio bearer between multiple radio access technologies may be made by a BS based at least on any of various other possible factors in addition to whether such radio resources are available to a UE and a radio bearer supports offloading and/or split bearer configuration. For example, network load considerations (e.g., including loading of the BS 102 and the AP 104), channel conditions (potentially for each available radio interface and channel), radio bearer characteristics (e.g, QCI value, characteristics of an application associated with the radio bearer), and/or various other factors may be considered by the BS 102 to determine whether to offload or split a given radio bearer at a given time.

For a radio bearer that is offloaded to another radio interface or split between multiple radio interfaces, data that is offloaded may be redirected from the BS 102 to the AP 104 and vice versa at any of multiple possible points in the protocol stacks of the BS 102 and the AP 104. As one possibility, such data may be re-directed from/to the non-access stratum (NAS) layer of the BS 102 to/from the internet protocol (IP) layer of the AP 104. As another possibility, such data may be redirected from/to the packet data convergence protocol (PDCP) layer of the BS 102 (possibly by way of the radio link control (RLC) layer of the BS 102) to/from the logical link control (LLC) layer of the AP 104. It should be noted that for a bearer redirected to WLAN or split between WLAN and cellular radio interfaces at the NAS layer, it may be the case that acknowledged mode (AM) communication is not possible, as for example at least in some instances no PDCP equivalent functionality may be available in WLAN and the redirection may occur above the PDCP layer in this case. Unacknowledged mode (UM) and transparent mode (TM) communication may still be possible in this case, however. For a bearer redirected to WLAN or split between WLAN and cellular radio interfaces at the PDCP/RLC layers, AM communication may be possible (in addition to UM and TM), as the RLC layer of the BS 102 may be able to provide automatic repeat request (ARQ) acknowledgement/negative acknowledgement (ACK/NACK) and packet buffering/retransmission capabilities over both WLAN and LTE radio interfaces.

Redirection of data in the UE 106 may similarly occur between WLAN and cellular protocol stacks of the UE 106 for data that is offloaded, at similar layers at which redirection occurs between the BS 102 and the AP 104. If the WLAN and cellular chipsets are collocated (e.g., on the same die) in the UE 106, redirection may occur using shared memory, as one possibility. Alternatively (e.g., if not collocated), an application processor of the UE 106 may manage packet redirection, and/or a coexistence interface such as the wireless coexistence interface 2 (WCI-2) serial interface may be used to carry packets between WLAN and cellular chipsets (e.g., at the appropriate layers).

It should be noted that the UE 106 may establish multiple radio bearers (e.g., for different applications with different QoS requirements and QCI values) such that those bearers are active between the UE 106 and the network by way of the BS 102 simultaneously. In such a case, it may be possible to treat each bearer separately with respect to offloading and splitting considerations. For example, at a first time, a UE 106 might have the first radio bearer offloaded to the WLAN radio interface between the AP 104 and the UE 106, and a second radio bearer that is not offloaded and that exclusively utilizes the cellular radio interface between the BS 102 and the UE 106. At a second time, the second radio bearer might be split such that some data is exchanged utilizing the cellular radio interface between the BS 102 and the UE 106 and some data is exchanged utilizing the WLAN radio interface between the AP 104 and the UE 106, while the first radio bearer remains entirely offloaded to the WLAN radio interface between the AP 104 and the UE 106. Any number of other configurations are also possible, e.g., depending on network configuration settings, current conditions experienced by the UE 106, the BS 102, and the AP 104, etc., as desired.

It should be noted that while the method of FIG. 5 is primarily described with respect to radio resource aggregation, offloading, and split bearer configuration between cellular and WLAN radio interfaces for convenience, it should be noted that similar principles may be applied to aggregate radio resources for other combinations of radio access technologies, and such combinations should also be considered within the scope of this disclosure.

FIGS. 6-14—Additional Information

FIGS. 6-14 and the information provided herein below in conjunction therewith are provided by way of example of various considerations and details relating to possible systems in which the method of FIG. 5 and/or other aspects of this disclosure may be implemented, and are not intended to be limiting to the disclosure as a whole. Numerous variations and alternatives to the details provided herein below are possible and should be considered within the scope of the disclosure.

Figure 6:
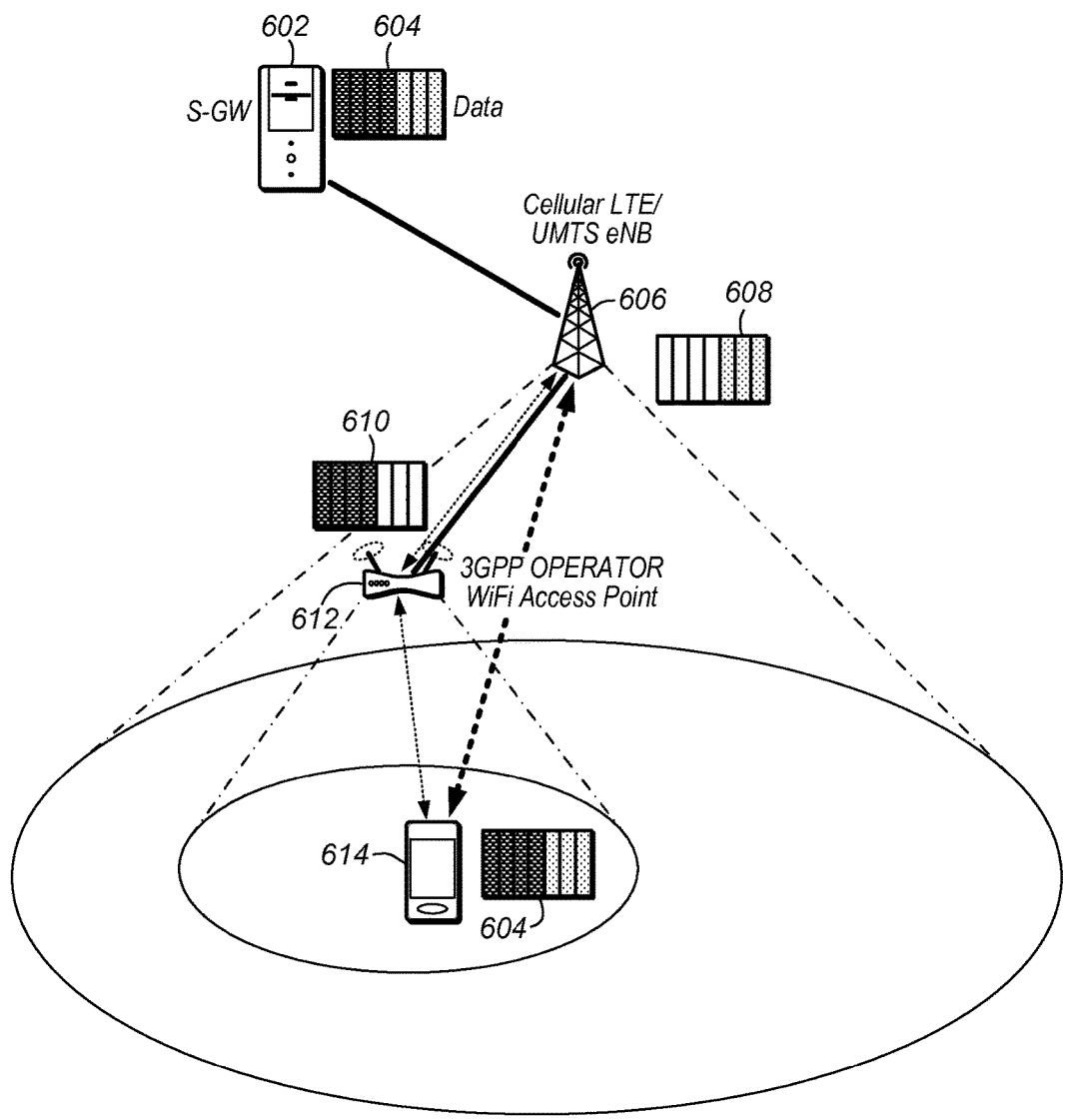
FIGS. 6-7 illustrate exemplary non-collocated and collocated network deployment scenarios.

FIG. 6 illustrates a possible multi-RAT radio resource aggregation scenario in an exemplary 3GPP network deployment in which a cellular base station (LTE/UMTS eNB) and a 3GPP network operator deployed Wi-Fi access point have overlapping coverage area but are not-collocated, according to some embodiments.

As shown, a serving gateway (S-GW) 602 in a cellular core network may have data 604 to send to a wireless user equipment device 614. The S-GW 602 may have a backhaul connection with the eNB 606, which may provide radio resources to the UE 614 according to a cellular (e.g., LTE or UMTS) radio interface and be an anchor point for radio resource aggregation for the UE 614. The eNB 606 may also have a backhaul connection with the AP 612, which it turn may provide radio resources to the UE 614 according to a WLAN (Wi-Fi) radio interface.

As shown, of the data 604, a first portion 608 may be transmitted to the UE 614 by the eNB 606 directly by way of the cellular radio interface between the UE 614 and the eNB 606. A second portion 610 may be redirected by the eNB 606 to the AP 612, which may in turn transmit the second portion 610 to the UE 614 by way of the WLAN radio interface between the UE 614 and the AP 612. The UE 614 may thus receive both the first portion 608 and the second portion 610 such that all of the data 604 is recovered by the UE 614.

Note that as one possibility, the data 604 may all be associated with a single radio bearer that may be in a split bearer configuration such that the portions 608, 610 may be transmitted using different radio interfaces. As a further possibility, the data 604 may include data associated with multiple radio bearers. For example, the first portion 608 may be associated with a radio bearer that is not offloaded or split but exclusively uses the cellular radio interface, while the second portion 610 may be associated with a different radio bearer that is offloaded to the WLAN interface.

Figure 7:
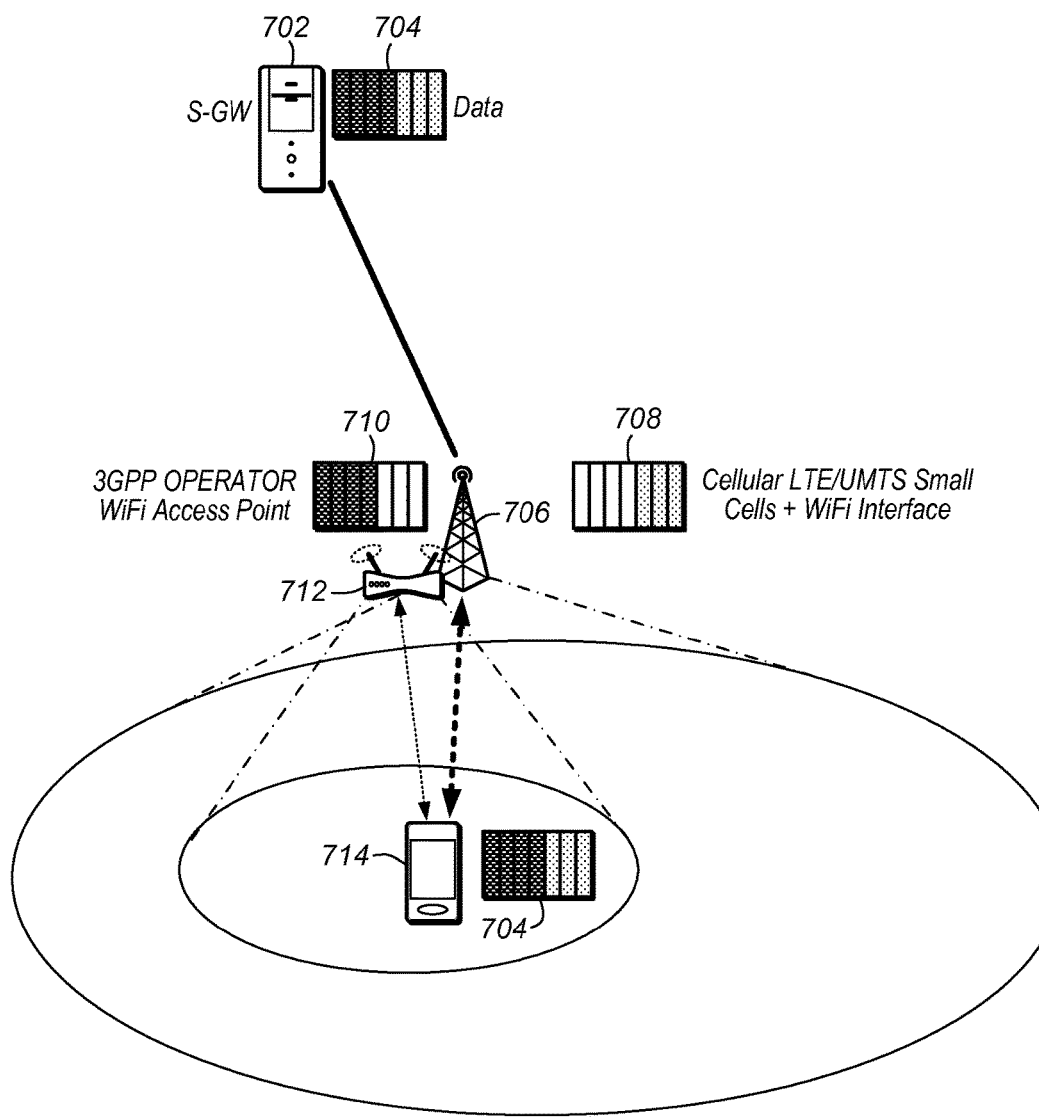

FIG. 7 illustrates a possible multi-RAT radio resource aggregation scenario in an exemplary 3GPP network deployment in which a cellular base station (LTE/UMTS small cell) and a 3GPP network operator deployed Wi-Fi access point have overlapping coverage area and are collocated, according to some embodiments.

As shown, a serving gateway (S-GW) 702 in a cellular core network may have data 704 to send to a wireless user equipment device 714. The S-GW 702 may have a backhaul connection with the small cell 706, which may provide radio resources to the UE 714 according to a cellular (e.g., LTE or UMTS) radio interface and be an anchor point for radio resource aggregation for the UE 714. The small cell 706 may also have a backhaul connection with the AP 712, which it turn may provide radio resources to the UE 714 according to a WLAN (Wi-Fi) radio interface.

Much as in the scenario of FIG. 6, of the data 704, a first portion 708 may be transmitted to the UE 714 by the small cell 706 directly by way of the cellular radio interface between the UE 714 and the small cell 706. A second portion 710 may be redirected by the small cell 706 to the AP 712, which may in turn transmit the second portion 710 to the UE 714 by way of the WLAN radio interface between the UE 714 and the AP 712. The UE 714 may thus receive both the first portion 708 and the second portion 710 such that all of the data 704 is recovered by the UE 714.

Similarly as described with respect to FIG. 6, the data 704 may all be associated with a single radio bearer that may be in a split bearer configuration such that the portions 708, 710 may be transmitted using different radio interfaces, or may include data associated with multiple radio bearers, of which one may be offloaded and one may not be offloaded, among various possibilities.

Figures 8A, 8B:
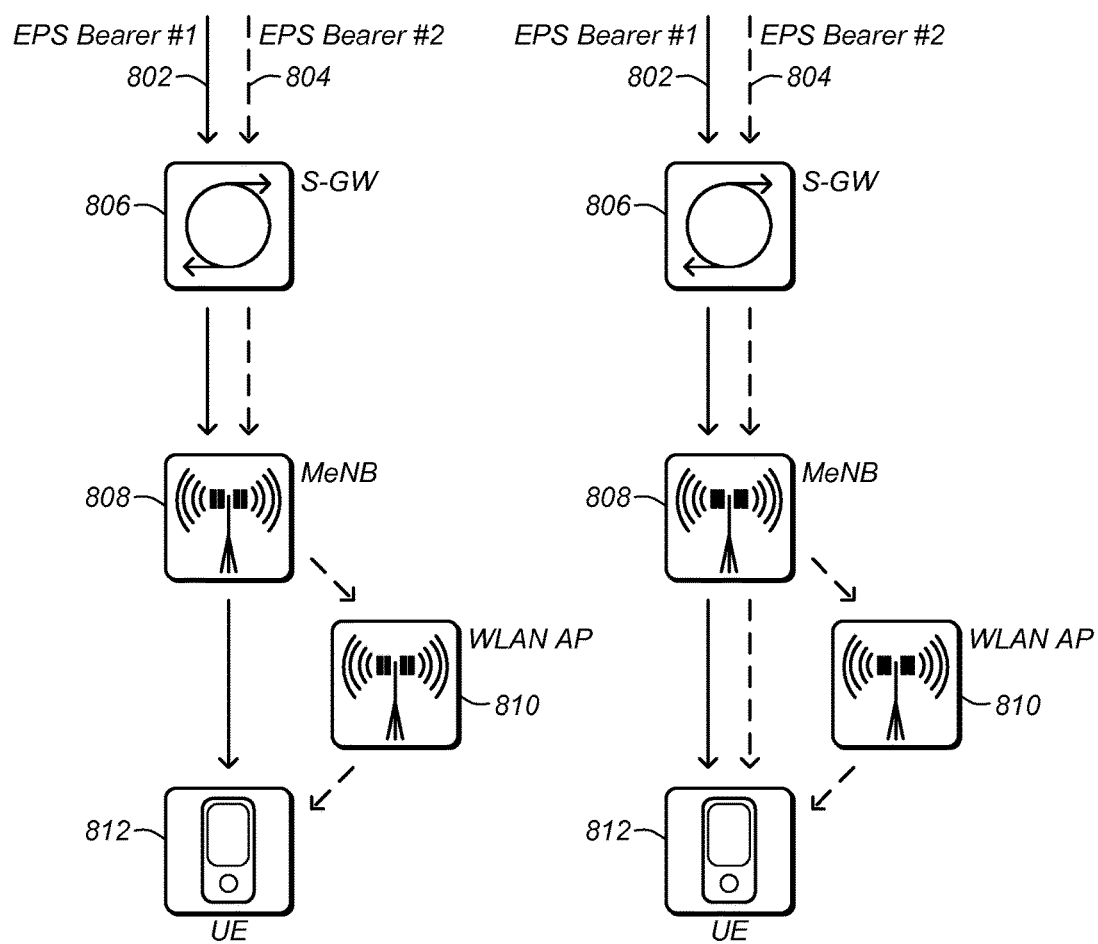
FIGS. 8A-8D illustrate exemplary radio bearer offloading and split bearer user space approaches for downlink and uplink communications between a UE and a network.
Figure 8C:
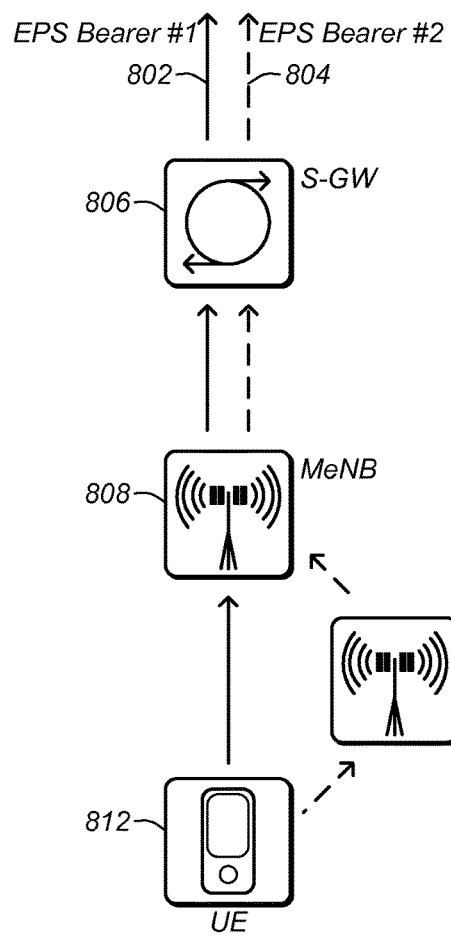
Figure 8D:
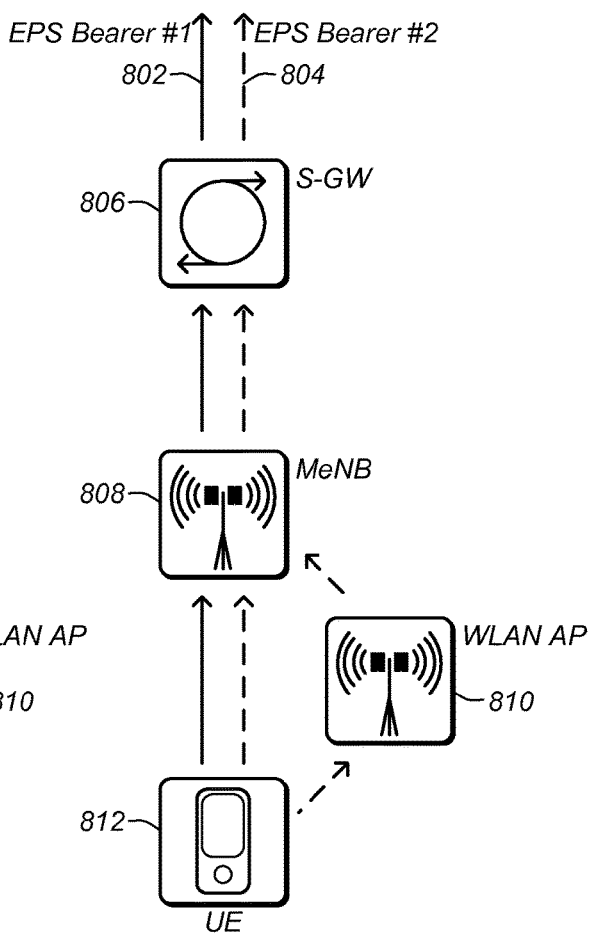

FIGS. 8A-8B illustrate exemplary radio bearer offloading and split bearer user space approaches for downlink communications between a UE and a network, while FIGS. 8C-8D illustrate exemplary radio bearer offloading and split bearer user space approaches for uplink communications between a UE and a network, according to some embodiments.

As shown in the exemplary illustrated scenarios, two evolved packet service (EPS) bearers 802, 804 providing network connections may be established for a UE 812, by way of a serving gateway 806, macro eNodeB 808, and WLAN AP 810.

Both bearers 802, 804 may be routed in the same manner between the S-GW 806 and the MeNB 808, both for downlink and uplink scenarios, and regardless of whether the bearer is offloaded, not offloaded, or split between WLAN and cellular radio interfaces. From the MeNB 808, the first bearer 802 may be routed directly from the MeNB 808 to the UE 812 via the cellular radio interface of the MeNB 808 and the UE 812 (in the downlink scenarios of FIGS. 8A-8B) or from the UE 812 to the MeNB 808 (in the uplink scenarios of FIGS. 8C-8D).

In the downlink offloading scenario of FIG. 8A, the second bearer 804 may be routed from the MeNB 808 to the WLAN AP 810, and to the UE 812 via the WLAN radio interface of the WLAN AP 810 and the UE 812.

In the downlink split bearer scenario of FIG. 8B, some data of the second bearer 804 may be routed directly from the MeNB 808 to the UE 812 via the cellular radio interface of the MeNB 808 and the UE 812, and some data of the second bearer 804 may be routed from the MeNB 808 to the WLAN AP 810, and to the UE 812 via the WLAN radio interface of the WLAN AP 810 and the UE 812.

In the uplink offloading scenario of FIG. 8C, the second bearer 804 may be routed from the UE 812 to the WLAN AP 810 via the WLAN radio interface of the WLAN AP 810 and the UE 812, and to the MeNB 808 via a backhaul connection between the WLAN AP 810 and the MeNB 808.

In the uplink split bearer scenario of FIG. 8D, some data of the second bearer 804 may be routed directly from the UE 812 to the MeNB 808 via the cellular radio interface of the MeNB 808 and the UE 812, and some data of the second bearer 804 may be routed from the UE 812 to the WLAN AP 810 via the WLAN radio interface of the WLAN AP 810 and the UE 812, and to the MeNB 808 via a backhaul connection between the WLAN AP 810 and the MeNB 808.

Figure 9:
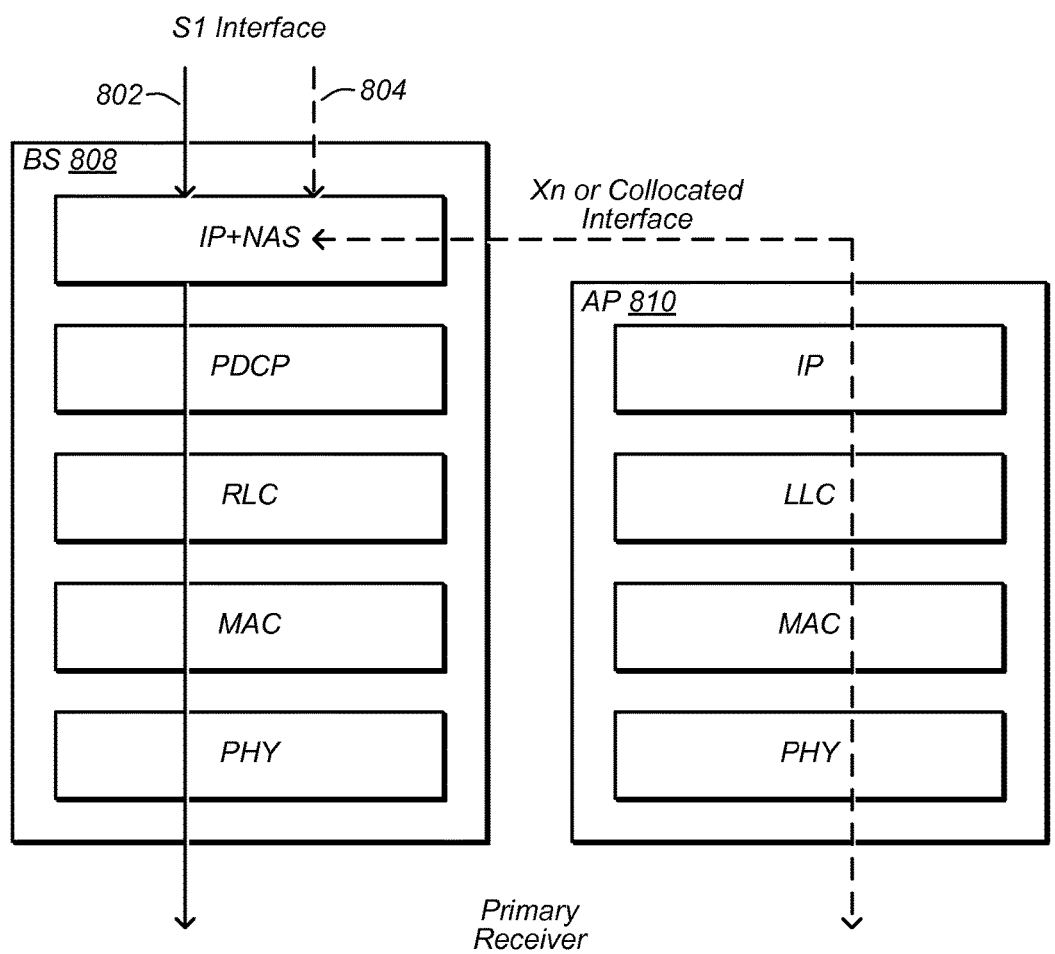
FIGS. 9-10 illustrate exemplary radio bearer offloading and split bearer scenarios for communication between a UE and a network in which bearer re-direction occurs at a non-access stratum layer.
Figure 10:
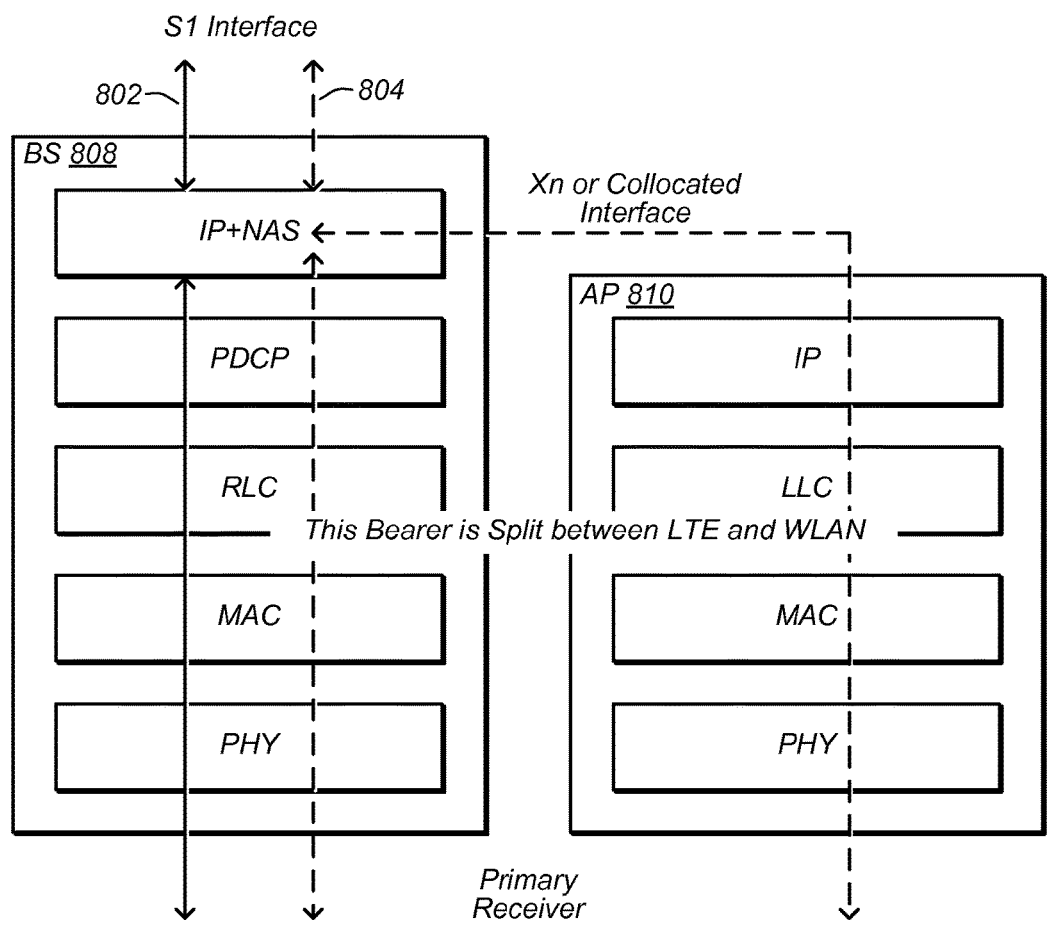
Figure 11:
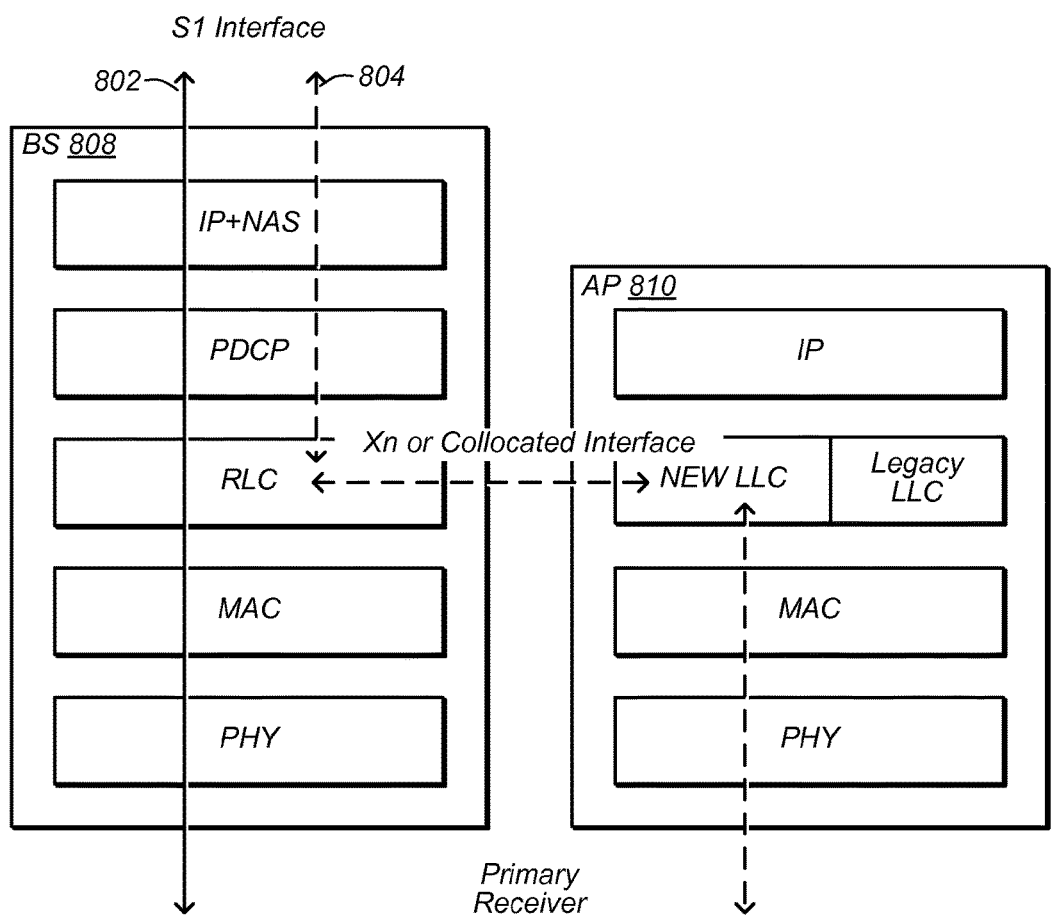
FIGS. 11-12 illustrate exemplary radio bearer offloading and split bearer scenarios for communication between a UE and a network in which bearer re-direction occurs at a radio link control layer.
Figure 12:
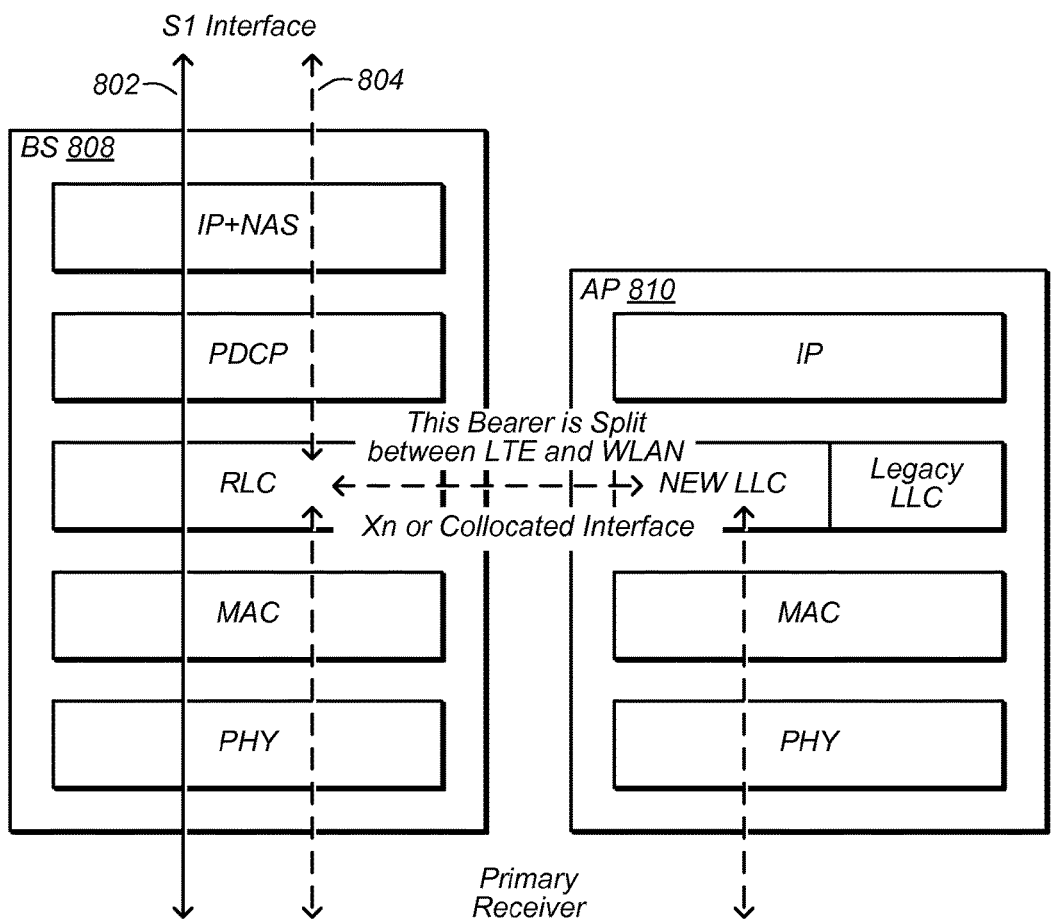
Figure 13:
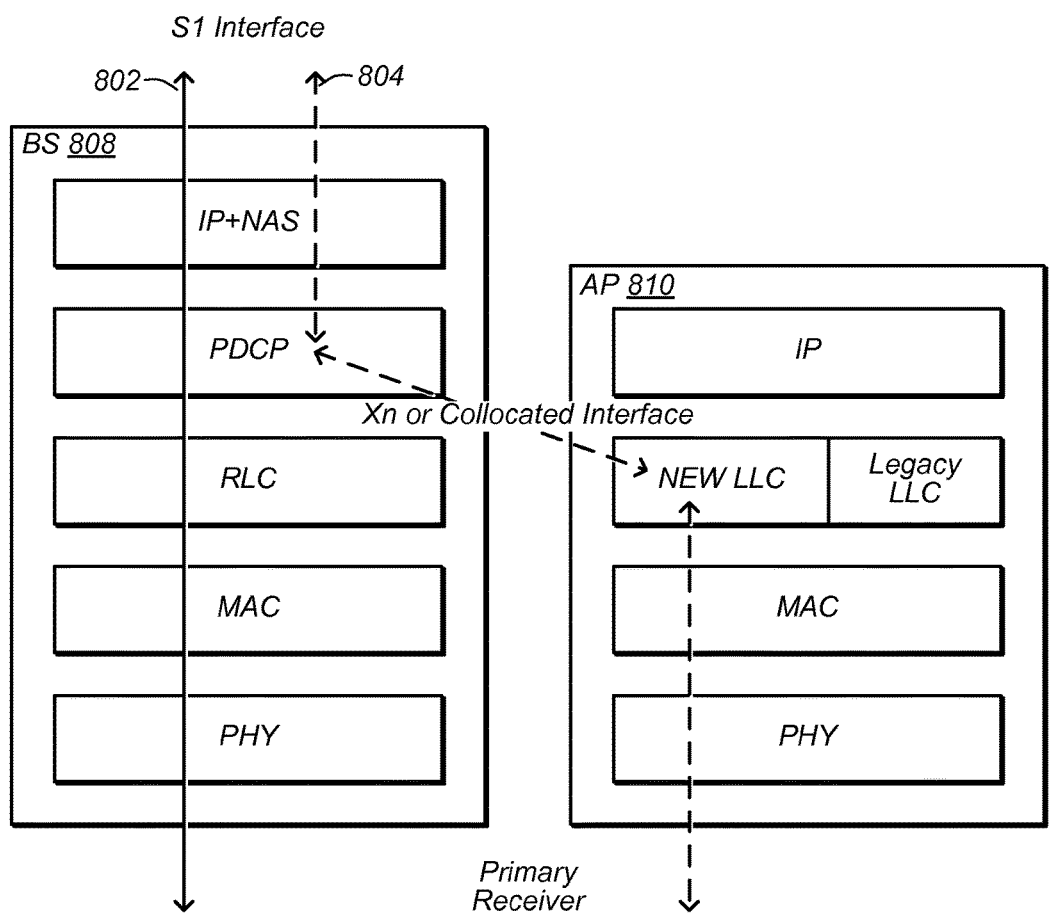
FIGS. 13-14 illustrate exemplary radio bearer offloading and split bearer scenarios for communication between a UE and a network in which bearer re-direction occurs at a packet data convergence protocol layer.
Figure 14:
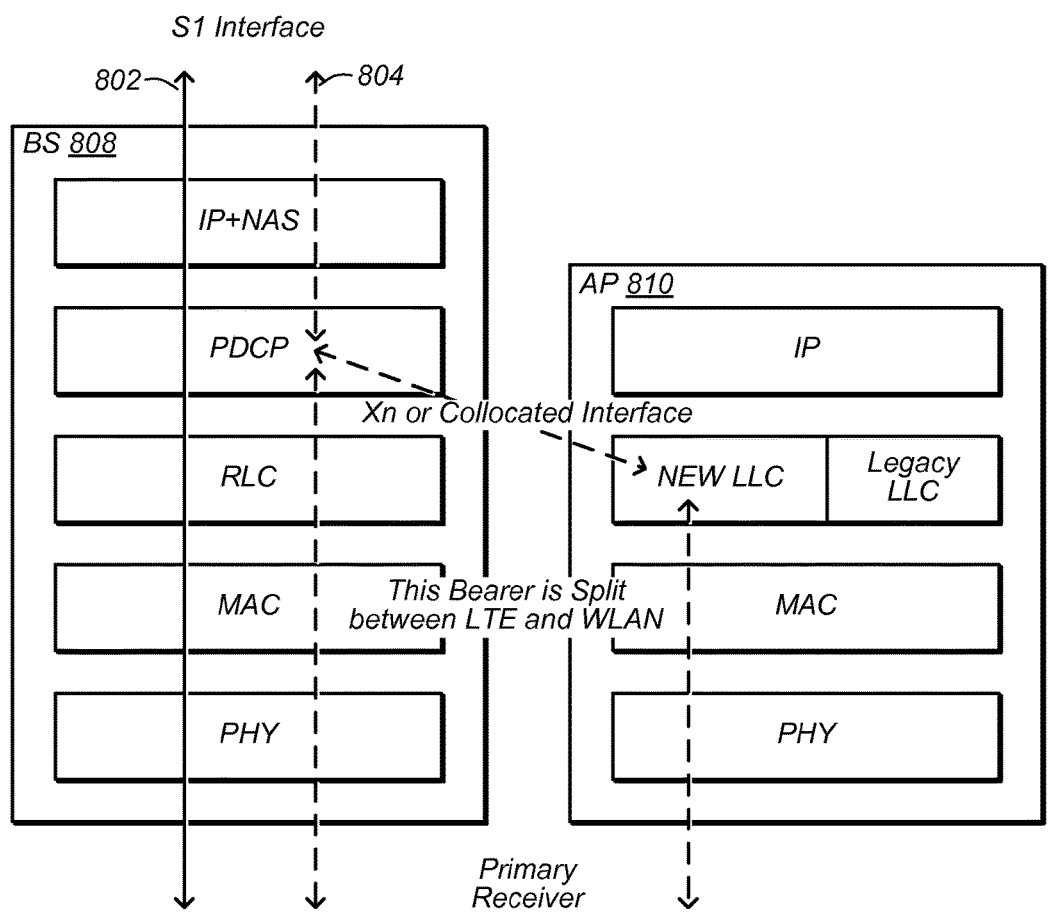

FIG. 9 illustrates an exemplary radio bearer offloading scenario for communication between a UE and a network in which bearer re-direction occurs at a non-access stratum layer of a base station, according to some embodiments. FIG. 10 illustrates an exemplary split radio bearer scenario for communication between a UE and a network in which bearer re-direction occurs at a non-access stratum layer of a base station, according to some embodiments. FIG. 11 illustrates an exemplary radio bearer offloading scenario for communication between a UE and a network in which bearer re-direction occurs at a radio link control layer of a base station, according to some embodiments. FIG. 12 illustrates an exemplary split radio bearer scenario for communication between a UE and a network in which bearer re-direction occurs at a radio link control layer of a base station, according to some embodiments. FIG. 13 illustrates an exemplary radio bearer offloading scenario for communication between a UE and a network in which bearer re-direction occurs at a packet data convergence protocol layer of a base station, according to some embodiments. FIG. 14 illustrates an exemplary split radio bearer scenario for communication between a UE and a network in which bearer re-direction occurs at a packet data convergence protocol layer of a base station, according to some embodiments. Thus, as shown, a bearer may either be not-offloaded (e.g., as the first bearer 802), offloaded (e.g., as the second bearer 804 in FIGS. 9, 11, and 13), or split between the cellular and WLAN radio interfaces (e.g., as the second bearer 804 in FIGS. 10, 12, and 14).

In each scenario, radio bearer data for a UE may be received by the base station 808 from a serving gateway (e.g., via an S1 interface). In FIGS. 9-10, it may be determined at the IP+NAS layer whether that data should be routed directly to the UE through the lower layers of the cellular protocol stack and the cellular radio interface (i.e., the cellular access stratum), or routed indirectly to the UE by way of a WLAN access point 810 and a WLAN radio interface (i.e., the WLAN access stratum). If the data is to be routed directly to the UE, the data may be passed down to the PDCP and further lower layers of the base station 808 for transmission as typical for cellular communication. If the data is to be routed by way of the AP 810, the data may instead be provided to the AP 810 (e.g, via an Xn or collocated interface, depending on the deployment scenario), which may then pass the data down through its protocol stack for transmission as typical for WLAN communication.

It should be noted that in this case, it may be possible that a bearer split between cellular and WLAN access strata or sent over WLAN may only use unacknowledged or transparent modes, e.g., if no PDCP equivalent functionality is available in WLAN, as may be typical. The IP/NAS layer may be provisioned to redirect packets to/from WLAN when WLAN/cellular dual connection/dual connectivity is enabled, and disabled when WLAN/cellular dual connection/dual connectivity is disabled.

In FIGS. 11-12, in contrast, it may be determined at the RLC layer whether that data should be routed directly to the UE through the lower layers of the cellular protocol stack and the cellular radio interface (i.e., the cellular access stratum), or routed indirectly to the UE by way of a WLAN access point 810 and a WLAN radio interface (i.e., the WLAN access stratum). If the data is to be routed directly to the UE, the data may be passed down to its MAC and PHY layers of the base station 808 for transmission as typical for cellular communication. If the data is to be routed by way of the AP 810, the RLC layer may instead provide the data to the AP 810 (e.g, via an Xn or collocated interface, depending on the deployment scenario) at its LLC layer, which may then pass the data down through its MAC and PHY layers for transmission as typical for WLAN communication.

In FIGS. 13-14, it may be determined at the PDCP layer whether that data should be routed directly to the UE through the lower layers of the cellular protocol stack and the cellular radio interface (i.e., the cellular access stratum), or routed indirectly to the UE by way of a WLAN access point 810 and a WLAN radio interface (i.e., the WLAN access stratum). If the data is to be routed directly to the UE, the data may be passed down to its RLC, MAC, and PHY layers of the base station 808 for transmission as typical for cellular communication. If the data is to be routed by way of the AP 810, the PDCP layer may instead provide the data to the AP 810 (e.g, via an Xn or collocated interface, depending on the deployment scenario) at its LLC layer, which may then pass the data down through its MAC and PHY layers for transmission as typical for WLAN communication.

In the scenarios of FIGS. 11-14, the PDCP layer of the base station 808 may be responsible for ciphering, buffering, processing, and routing all packets through WLAN and cellular radio interfaces. According to the scenarios of FIGS. 11-12, the RLC may be responsible for routing packets to a WLAN new LLC layer in addition to automatic repeat request (ARQ) acknowledgements/negative acknowledgments and packet buffering/retransmission over cellular and WLAN radio interfaces. According to the scenarios of FIGS. 13-14, the PDCP layer may be responsible for routing packets to a WLAN new LLC layer. It should be noted that in this case, it may be possible that a bearer split between cellular and WLAN access strata or sent over WLAN may use any of acknowledged, unacknowledged, or transparent modes, since the PDCP/RLC functionality may be available even to such offloaded/split bearers. Additionally, it should be noted that in order to support offloading and bearer splitting between the PDCP/RLC layers of the cellular protocol stack and the LLC layer of the WLAN protocol stack, the (e.g., new) LLC layer of the WLAN protocol stack may be extended to support the PDCP and/or RLC payload header format(s). Further, at least in some instances the cellular protocol stack may be responsible for robust header compression (ROHC) for both cellular and WLAN offloaded traffic.

In order to support such radio resource aggregation and cellular/WLAN interworking, base stations, access points, and/or user equipment devices may be provided with certain features and information.

As one example, a network that supports such radio resource aggregation may provide rules (e.g., RRC rules) for performing WLAN AP selection and traffic offloading from cellular to WLAN radio interfaces, and/or threshold values that may be used for cellular and WLAN selection. Such information may be provided by way of dedicated signaling (e.g., specific to each UE), or in broadcast system information (e.g., in a system information block, such as LTE system information 17). The cellular thresholds may include values for one or more of reference signal received power (RSRP), reference signal received quality (RSRQ), common pilot channel (CPICH) received signal code power (RSCP), Ec/No, and/or any of various other parameters. The WLAN thresholds may include values for one or more of received signal strength indicator (RSSI), backhaul rate, basic service set (BSS) load, and/or any of various other parameters. A UE may thus perform measurements of cells and wireless networks and, using these parameters and the RRC defined rules, make decisions on whether to connect to available WLAN APs and offload traffic to and from WLAN.

Alternatively or additionally, a UE may be configured to report Wi-Fi measurements to its cellular network. Such measurements could be self-configured and triggered by the UE, may be configured and triggered by base station (e.g., eNB) of the UE, or some combination thereof. For example, the UE could report Wi-Fi SSID/BSSID in addition to RSSI measurements of one or more detectable WLAN APs to its base station. The base station could use this information to trigger WLAN attachment by the UE and/or resource aggregation between multiple RATs (e.g., splitting/offloading bearer(s) in downlink and/or uplink).

Such features may also be used to allow WLAN discovery for cellular/WLAN bearer splitting; for example, an additional rule in RRC may be used in order to enable cellular/WLAN bearer splitting, on top of offloading. Similarly, additional thresholds could be defined and broadcasted by the network to separate scenarios that trigger bearer splitting from scenarios that trigger WLAN offloading.

As another example, a feature group indicator (FGI) may be defined and used by a UE to signal its degree of support for cellular/WLAN integration (e.g., including whether the UE supports radio resource aggregation with cellular/WLAN offloading and/or split bearer configurations). Furthermore, as previously noted, if desired, a radio bearer may be marked as supporting or not supporting each (or both) of offloading and split bearer configurations; as one possibility for implementing such a marker, upon PDN and RRC connection establishment, an RRC connection record may be used to indicate (mark) whether a specific PDN/radio bearer can be (each or both of) offloaded and split.

A UE in connected mode may be able to identify WLAN APs identified in a cellular system information block, evaluate the WLAN re-selection rules, perform WLAN re-selection, and send RRC signaling to the network in order to request resource aggregation of the WLAN radio resources, as previously noted. The UE may also indicate the PDN/radio bearer to offload, if desired. The network may then send an indication to the UE to start the radio resource aggregation, e.g., using dedicated signaling.

If the UE is in idle mode, the UE may still be able to perform WLAN AP selection. In this case, cellular/WLAN radio resource aggregation may be requested by the UE (and acknowledged by the network) during the RRC establishment procedure.

As previously noted, the 3GPP access network discovery and selection function (ANDSF) may be used to facilitate some of the features described herein for more tightly coupling WLAN and cellular interworking, at least in some instances. An ANDSF module may provide a 3GPP wireless device with information about available non-3GPP networks and policies for selecting and using such networks. For example, the ANDSF may be used to facilitate selection by a wireless device of 802.11 based networks, CDMA2000 information, WiMAX information, etc. The ANDSF may generally be location and UE specific, and may be used for WLAN AP selection, traffic offloading, and/or triggering bearer split between WLAN and cellular radio interfaces. For example, inter-system mobility policy (ISMP) rules could be used for this purpose, if desired.

In the following further exemplary embodiments are provided.

One set of embodiments may include a base station (BS), including: a radio; and a processing element communicatively coupled to the radio; wherein the radio and the processing element are configured to: establish a radio bearer with a wireless user equipment (UE) device according to a first RAT; determine whether the radio bearer supports offloading to a second RAT and whether the radio bearer supports a split bearer configuration between the first RAT and the second RAT; if the radio bearer supports offloading to the second RAT and radio resources according to the second RAT are available to the UE, offload the radio bearer from the first RAT to the second RAT; and if the radio bearer supports a split bearer configuration between the first RAT and the second RAT and radio resources according to the second RAT are available to the UE, split the radio bearer such that some data of the radio bearer is exchanged between the base station and the UE via the first RAT and some data of the radio bearer is exchanged between the base station and the UE via the second RAT.

According to some embodiments, the radio and the processing element are further configured to: receive an indication from the UE that radio resources according to the second RAT are available to the UE; determine that radio resources according to the second RAT are available to the UE based on the indication from the UE.

According to some embodiments, the base station operates according to the first RAT, wherein the indication from the UE further indicates an access point device from which radio resources according to the second RAT are available to the UE, wherein to offload the radio bearer to the second RAT, the base station is configured to redirect data of the radio bearer to and from the UE by way of the access point device, wherein to split the radio bearer, the base station is configured to exchange some data of the radio bearer with the UE directly by the base station and exchange some data of the radio bearer with the UE indirectly by way of the access point device.

According to some embodiments, the radio bearer provides a portion of a first network connection between the UE and a network, wherein to establish the radio bearer, the base station is configured to receive an indication of whether the radio bearer supports offloading to the second RAT and an indication of whether the radio bearer supports a split bearer configuration between the first RAT and the second RAT from at least one of the network and the UE, wherein the radio and the processing element are further configured to determine whether the radio bearer supports offloading to a second RAT and whether the radio bearer supports a split bearer configuration between the first RAT and the second RAT based on the indication of whether the radio bearer supports offloading to the second RAT and the indication of whether the radio bearer supports a split bearer configuration between the first RAT and the second RAT.

According to some embodiments, the indication of whether the radio bearer supports offloading to the second RAT and the indication of whether the radio bearer supports a split bearer configuration between the first RAT and the second RAT are based at least in part on Quality of Service considerations for the network connection.

According to some embodiments, the first RAT is one of LTE or UMTS, wherein the second RAT is Wi-Fi.

A further set of embodiments may include a method, including: by a base station: establishing a first radio bearer with a wireless user equipment (UE) device, wherein the first radio bearer utilizes a cellular radio interface; receiving an indication to aggregate, at the base station, for the UE, radio resources of an access point that utilizes a wireless local area network (WLAN) radio interface; and redirecting downlink data for the UE to the access point to be transmitted to the UE using the WLAN radio interface.

According to some embodiments, the method can further include: receiving uplink data of the UE from the access point, wherein the uplink data is received by the access point from the UE using the WLAN radio interface.

According to some embodiments, the first radio bearer provides a link to the UE for a first network connection of the UE.

According to some embodiments, establishing the first radio bearer includes receiving an indication that the first radio bearer is offloadable to the WLAN radio interface, wherein redirecting downlink data for the UE to the access point to be transmitted to the UE using the WLAN radio interface includes offloading the first radio bearer to the WLAN radio interface.

According to some embodiments, establishing the first radio bearer includes receiving an indication that the first radio bearer is splitable between the cellular radio interface and the WLAN radio interface; wherein redirecting downlink data for the UE to the access point to be transmitted to the UE using the WLAN radio interface includes redirecting a first portion of downlink data of the first radio bearer to the WLAN radio interface, wherein a second portion of downlink data of the first radio bearer is transmitted to the UE utilizing the cellular radio interface such that the first radio bearer is split between the cellular radio interface and the WLAN radio interface.

According to some embodiments, the downlink data is redirected to the access point at a non-access stratum layer of the base station.

According to some embodiments, the downlink data is redirected to the access point at a packet data convergence protocol (PDCP) layer of the base station.

According to some embodiments, the downlink data is redirected to the access point at a radio link control (RLC) layer of the base station.

According to some embodiments, the access point is selected by the UE, wherein the indication to aggregate radio resources of the access point for the UE is received from the UE.

Yet another set of embodiments may include a wireless user equipment (UE) device, including: a radio; and a processing element communicatively coupled to the radio; wherein the radio and the processing element are configured to: establish a first radio bearer with the base station using radio resources provided according to a first radio interface, wherein to establish the first radio bearer the UE is configured to determine whether the first radio bearer supports use of radio resources provided according to a second radio interface; determine that radio resources provided according to the second radio interface are available to the UE; indicate to the base station that radio resources provided according to the second radio interface are available to the UE; and offload at least a portion of uplink and/or downlink data of the first radio bearer to the radio resources provided according to the second radio interface if the first radio bearer supports use of radio resources provided using the second radio interface.

According to some embodiments, to offload at least a portion of data of the first radio bearer to the radio resources provided according to the second radio interface, the UE is configured to split the first radio bearer such that data of the first radio bearer is exchanged between the base station and the UE by way of both radio resources provided according to the first radio interface and radio resources provided according to the second radio interface.

According to some embodiments, the first radio interface is a cellular radio interface, wherein the second radio interface is a Wi-Fi radio interface.

According to some embodiments, to offload at least a portion of data of the first radio bearer to the radio resources provided according to the second radio interface, the UE is configured to provide uplink data of the first radio bearer from a cellular modem of the UE to a Wi-Fi chipset of the UE for uplink transmission according to the second radio interface.

According to some embodiments, to offload at least a portion of data of the first radio bearer to the radio resources provided according to the second radio interface, the UE is configured to redirect uplink data from a non-access stratum layer of a cellular protocol stack of the UE to an internet protocol layer of a Wi-Fi protocol stack of the UE.

According to some embodiments, to offload at least a portion of data of the first radio bearer to the radio resources provided according to the second radio interface, the UE is configured to redirect uplink data from a packet data convergence protocol (PDCP) layer of a cellular protocol stack of the UE to a logical link control (LLC) layer of a Wi-Fi protocol stack of the UE.

According to some embodiments, to offload at least a portion of data of the first radio bearer to the radio resources provided according to the second radio interface, the UE is configured to redirect uplink data from a radio link control (RLC) layer of a cellular protocol stack of the UE to a logical link control (LLC) layer of a Wi-Fi protocol stack of the UE.

According to some embodiments, to determine that radio resources provided according to the second radio interface are available to the UE, the radio and the processing element are further configured to: receive an indication of at least one access point that provides radio resources according to the second radio interface from the base station; detect an access point of the indicated at least one access point; measure at least one of signal strength, loading, and estimated throughput of the access point; wherein if the at least one of signal strength, loading, and estimated throughput of the access point meet predetermined threshold requirements, the UE is configured to determine that radio resources provided according to the second radio interface are available to the UE by way of the access point.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless user equipment (UE) device comprising:
a radio; and
a processing element communicatively coupled to the radio;
wherein the radio and the processing element are configured to:
    establish a first radio bearer with a base station using uplink radio resources provided according to a first radio interface, wherein to establish the first radio bearer the UE device is configured to:
        determine whether the UE device supports use of radio resources provided according to a second radio interface;
        determine whether the UE device supports a split bearer configuration;
        signal to the base station that the UE supports use of to the second radio interface; and
        signal to the base station that the UE supports the split bearer configuration;
    determine that radio resources provided according to the second radio interface are available to the UE device;
    indicate to the base station that radio resources provided by a first access point according to the second radio interface are available to the UE device;
    receive, from the base station using signaling specific to the UE, radio resource control (RRC) information for performing access point selection for redirection of uplink data by the UE to according to the second radio interface;
    attach to the first access point using the second radio interface based on triggering from the base station;
    redirect at least a portion of uplink data of the first radio bearer to the radio resources provided by the first access point according to the second radio interface based at least in part on the determination that the UE device supports use of radio resources provided by the first access point using the second radio interface and/or the determination that the UE supports the split bearer configuration, wherein said redirecting comprises redirecting the portion of uplink data at a cellular protocol stack packet data convergence protocol (PDCP) layer of the UE device using a split bearer configuration, wherein the PDCP layer of the UE device performs ciphering, buffering, processing, and routing uplink packets of the portion of uplink data through the first and second radio interfaces; and
    subsequently, perform access point reselection for redirecting at least a portion of the uplink data of the first radio bearer to a second access point, different than the first access point, based on the RRC information for performing access point selection for redirection of uplink data by the UE according to the second radio interface.

2. The UE device of claim 1,
wherein to redirect at least a portion of data of the first radio bearer to the radio resources provided according to the second radio interface, the UE is configured to provide uplink data of the first radio bearer from a cellular modem of the UE to a Wi-Fi chipset of the UE for uplink transmission according to the second radio interface.

3. The UE device of claim 1, wherein to determine that radio resources provided according to the second radio interface are available to the UE, the radio and the processing element are further configured to:
    receive an indication of at least one access point that provides radio resources according to the second radio interface from the base station;
    detect an access point of the indicated at least one access point;
    measure at least one of signal strength, loading, and estimated throughput of the access point;
    wherein if the at least one of signal strength, loading, and estimated throughput of the access point meet predetermined threshold requirements, the UE device is configured to determine that radio resources provided according to the second radio interface are available to the UE device by way of the access point.

4. The UE device of claim 1,
wherein to signal to the base station that the UE device supports use of to the second radio interface and that the UE device supports the split bearer configuration, the UE device is further configured to transmit a feature group indicator (FGI) to the base station.

5. A method for operating a wireless user equipment (UE) device, the method comprising:
    establishing a first radio bearer with a base station wherein the first radio bearer utilizes uplink radio resources of a cellular radio interface;
    determining that the UE device supports offloading to a wireless local area networking (WLAN) radio interface;
    signaling to the base station that the UE device supports offloading to the WLAN radio interface;
    determining that the UE device supports a split bearer configuration between the cellular radio interface and the WLAN radio interface;
    signaling to the base station that the UE device supports the split bearer configuration between the cellular radio interface and the WLAN radio interface;
    determining that radio resources provided according to the WLAN radio interface are available to the UE device;
    indicating to the base station that radio resources provided by a first access point according to the WLAN radio interface are available to the UE device;
    receiving, from the base station using signaling specific to the UE device, radio resource control (RRC) information for performing access point selection for redirection of data by the UE device to according to the WLAN radio interface;
attaching to the first access point using the WLAN radio interface based on triggering from the base station;
in response to a decision to split the first radio bearer from the base station based on the indication that radio resources provided by the first access point according to the WLAN radio interface are available to the UE device, route a portion of data of the first radio bearer over an uplink of the radio resources provided by the first access point according to the WLAN radio interface using a split bearer configuration, wherein a cellular protocol stack packet data convergence protocol (PDCP) layer of the of the UE device performs ciphering, buffering, processing, and routing packets of the first radio bearer through uplinks of the WLAN and cellular radio interfaces; and
subsequently, performing access point selection for redirecting at least a portion of data of the first radio bearer to a second access point, different than the first access point, based on the RRC information for performing access point selection for redirection of data by the UE device according to the WLAN radio interface.

6. The method of claim 5, the method further comprising:
receiving a trigger for radio resource aggregation to split the first radio bearer.

7. The method of claim 5, the method further comprising:
reporting WLAN radio interface measurements comprising at least a service set identifier (SSID) or basic service set identifier (BSSID) and a received signal strength indicator (RSSI) measurement of one or more detectable WLAN access points wherein the measurements are configured by the base station.

8. The method of claim 7, wherein the measurements are triggered by the base station.

9. The method of claim 7, wherein the measurements are triggered by the UE device.

10. The method of claim 5, the method further comprising:
at a subsequent time, routing a portion of data of a second radio bearer to the radio resources provided according to the WLAN radio interface, wherein the UE is configured to route uplink data from a non-access stratum layer of a cellular protocol stack of the UE to an internet protocol layer of a WLAN protocol stack of the UE for transmission through the WLAN radio interface.

11. The method of claim 5, the method further comprising:
at a subsequent time, offloading data of a second radio bearer to the radio resources provided according to the WLAN radio interface, wherein the UE is configured to redirect uplink data from a non-access stratum layer of a cellular protocol stack of the UE to an internet protocol layer of a WLAN protocol stack of the UE for transmission through the WLAN radio interface.

12. The method of claim 5, wherein to route a portion of data of the first radio bearer over the uplink of the WLAN radio interface, the UE is configured to route uplink data from the PDCP layer of the cellular protocol stack of the UE to a logical link control (LLC) layer of a WLAN protocol stack of the UE.

13. The method of claim 12, wherein the layer of a WLAN protocol stack of the UE is a new layer extended to support bearer splitting.

14. The method of claim 5, wherein to determine that radio resources provided according to the WLAN radio interface are available to the UE, the method comprises:
receiving an indication of at least one access point that provides radio resources according to the WLAN radio interface from the base station;
detecting an access point of the indicated at least one access point;
measuring at least one of signal strength, loading, and estimated throughput of the access point;
wherein if the at least one of signal strength, loading, and estimated throughput of the access point meet predetermined threshold requirements, the method comprises determining that radio resources provided according to the WLAN radio interface are available to the UE by way of the access point.

15. An apparatus for managing a user equipment device (UE), the apparatus comprising:
a processor configured to cause the UE to:
establish a first radio bearer with a base station using uplink radio resources provided according to a first radio interface;
determine whether the UE device supports use of radio resources provided according to a second radio interface;
determine whether the UE device supports a split bearer configuration;
signal to the base station that the UE supports use of to the second radio interface; and
signal to the base station that the UE supports the split bearer configuration;
determine that radio resources provided according to the second radio interface are available to the UE device;
indicate to the base station that radio resources provided by a first access point according to the second radio interface are available to the UE device;
receive, from the base station using signaling specific to the UE, radio resource control (RRC) information for performing access point selection for redirection of uplink data by the UE to according to the second radio interface;
attach to the first access point using the second radio interface based on triggering from the base station;
redirect at least a portion of uplink data of the first radio bearer to the radio resources provided by the first access point according to the second radio interface based at least in part on the determination that the UE device supports use of radio resources provided by the first access point using the second radio interface and/or the determination that the UE supports the split bearer configuration, wherein said redirecting comprises redirecting the portion of uplink data at a cellular protocol stack packet data convergence protocol (PDCP) layer of the UE device using a split bearer configuration, wherein the PDCP layer of the of the UE device performs ciphering, buffering, processing, and routing uplink packets of the portion of uplink data through the first and second radio interfaces; and
subsequently, perform access point selection for redirecting at least a portion of the uplink data of the first radio bearer to a second access point, different than the first access point, based on the RRC information for performing access point selection for redirection of uplink data by the UE according to the second radio interface.

16. The apparatus of claim 15,
wherein to redirect at least a portion of data of the first radio bearer to the radio resources provided according to the second radio interface, the UE is configured to provide uplink data of the first radio bearer from a cellular modem of the UE to a wireless local area network (WLAN) chipset of the UE for uplink transmission according to the second radio interface.

17. The apparatus of claim 15, wherein to determine that radio resources provided according to the second radio interface are available to the UE, the radio and the processor are further configured to cause the UE to:
receive an indication of at least one access point that provides radio resources according to the second radio interface from the base station;
detect the first access point, wherein the first access point is one of the indicated at least one access point;
measure at least one of signal strength, loading, and estimated throughput of the first access point;
wherein if the at least one of signal strength, loading, and estimated throughput of the access point meet predetermined threshold requirements, the UE device is configured to determine that radio resources provided according to the second radio interface are available to the UE device by way of the first access point.

18. The apparatus of claim 15, wherein to signal to the base station that the UE supports use of to the second radio interface and that the UE supports the split bearer configuration, the apparatus is further configured to cause the UE to transmit a feature group indicator (FGI) to the base station.

19. The apparatus of claim 15, wherein the second radio interface is wireless local area network (WLAN), wherein the radio and the processor are further configured to cause the UE to:
report WLAN radio interface measurements comprising at least a service set identifier (SSID) or basic service set identifier (BSSID) and a received signal strength indicator (RSSI) measurement of one or more detectable WLAN access points wherein the measurements are configured by the base station.

20. The apparatus of claim 19, wherein the measurements are triggered by the base station.

21. The apparatus of claim 19, wherein the measurements are triggered by the UE.

22. A memory medium comprising program instructions, wherein, when executed by a processor, the program instructions are executable to cause a user equipment device (UE) to:
establish a first radio bearer with a base station using uplink radio resources provided according to a cellular radio interface;
determine whether the UE device supports use of radio resources provided according to a wireless local area network (WLAN) radio interface;
determine whether the UE device supports a split bearer configuration;
signal to the base station that the UE supports use of to the WLAN radio interface; and
signal to the base station that the UE supports the split bearer configuration;
determine that radio resources provided according to the WLAN radio interface are available to the UE device;
indicate to the base station that radio resources provided by a first access point according to the WLAN radio interface are available to the UE device;
receive, from the base station using signaling specific to the UE, radio resource control (RRC) information for performing access point selection for redirection of uplink data by the UE to according to the WLAN radio interface;
attach to the first access point using the WLAN radio interface based on triggering from the base station;
redirect at least a portion of uplink data of the first radio bearer to the radio resources provided by the first access point according to the WLAN radio interface based at least in part on the determination that the UE device supports use of radio resources provided by the first access point using the WLAN radio interface and/or the determination that the UE supports the split bearer configuration, wherein said redirecting comprises redirecting the portion of uplink data at a cellular protocol stack packet data convergence protocol (PDCP) layer of the UE device using a split bearer configuration, wherein the PDCP layer of the of the UE device performs ciphering, buffering, processing, and routing uplink packets of the portion of uplink data through the cellular and WLAN radio interfaces; and
subsequently, perform access point selection for redirecting at least a portion of the uplink data of the first radio bearer to a second access point, different than the first access point, based on the RRC information for performing access point selection for redirection of uplink data by the UE according to the WLAN radio interface.

23. The memory medium of claim 22, wherein the program instructions are further executable to cause the UE to:
at a subsequent time, route a portion of data of a second radio bearer to the radio resources provided according to the WLAN radio interface, wherein the UE is configured to route uplink data from a non-access stratum layer of a cellular protocol stack of the UE to an internet protocol layer of a WLAN protocol stack of the UE for transmission through the WLAN radio interface.

24. The memory medium of claim 22, wherein the program instructions are further executable to cause the UE to:
at a subsequent time, offload data of a second radio bearer to the radio resources provided according to the WLAN radio interface, wherein the UE is configured to redirect uplink data from a non-access stratum layer of a cellular protocol stack of the UE to an internet protocol layer of a WLAN protocol stack of the UE for transmission through the WLAN radio interface.

25. The memory medium of claim 22, wherein to redirect the portion of uplink data of the first radio bearer to the radio resources provided by the first access point according to the WLAN radio interface includes routing uplink data from the PDCP layer of the cellular protocol stack of the UE to a logical link control (LLC) layer of a WLAN protocol stack of the UE.

26. The memory medium of claim 25, wherein the layer of a WLAN protocol stack of the UE is a new layer extended to support bearer splitting.

27. The memory medium of claim 22, wherein to indicate to the base station that radio resources provided by the first access point according to the WLAN radio interface are available to the UE device includes reporting a service set identifier associated with the first access point.

* * * * *